United States Patent Office 3,094,884
Patented June 25, 1963

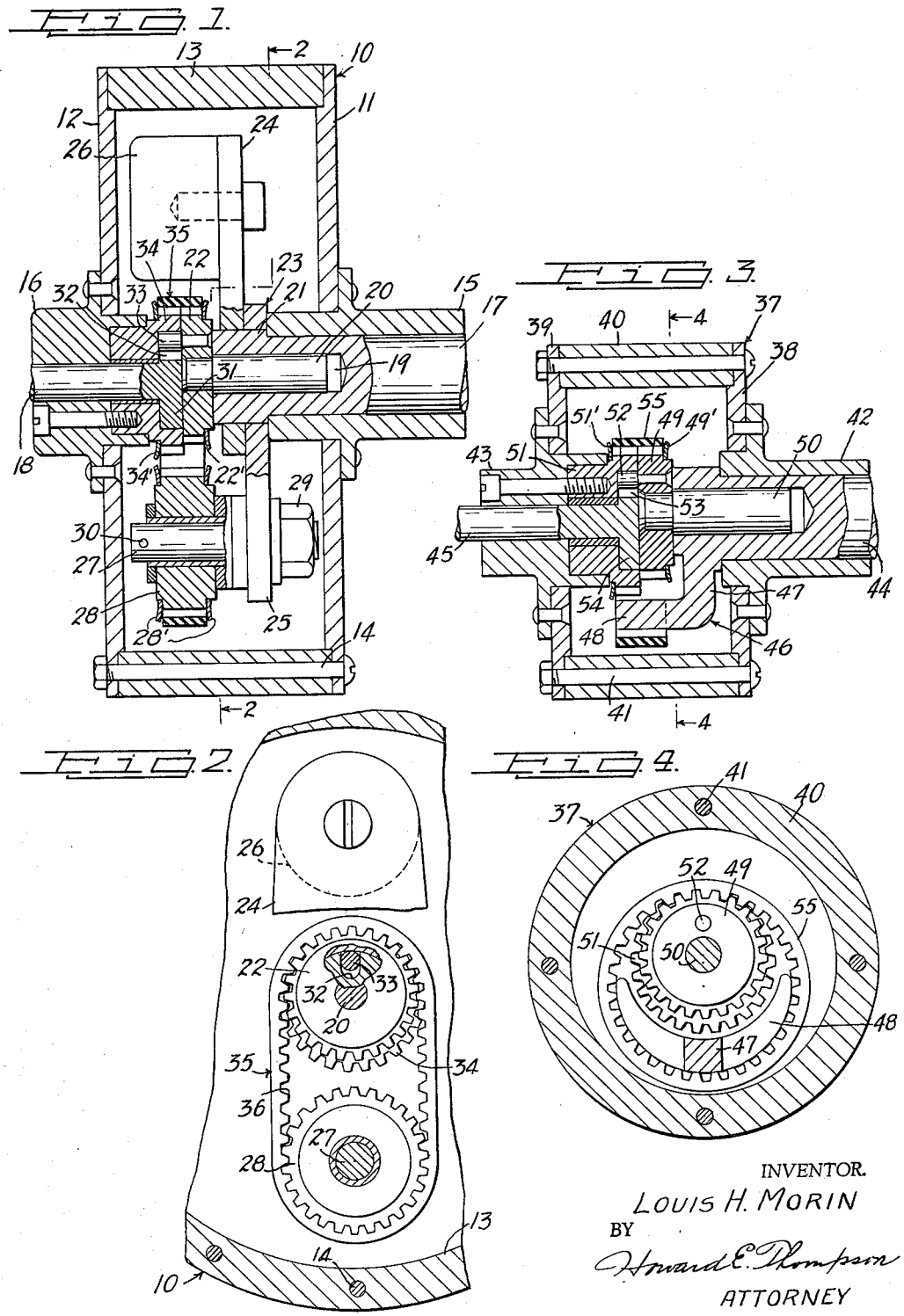

3,094,884
SPEED REDUCER EMPLOYING A TIMING
CHAIN CONTROL
Louis H. Morin, 125 Beechwood Ave., Bronx, N.Y.
Filed Dec. 27, 1961, Ser. No. 162,463
7 Claims. (Cl. 74—804)

This invention relates to speed reducers, wherein a timing chain control is provided to regulate the differential drive between the drive shaft and the driven shaft of the reducer. More particularly, the invention deals with a structure of the character defined, wherein a lever member is directly actuated by the drive shaft in controlling engagement of the timing chain with tooth-like members having a varied number of teeth, the variance in teeth controlling the speed reduction of drive of the driven shaft as compared with that of the drive shaft.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through one form of reducer which I employ, parts of the construction being shown in elevation and parts broken away.

FIG. 2 is a partial section on the broken line 2—2 of FIG. 1, with part of the construction broken away and in section and omitting part of the structure shown in FIG. 1.

FIG. 3 is a view, similar to FIG. 1, showing a modified form of reducer, with parts of the construction shown in elevation; and FIG. 4 is a section, generally on the line 4—4 of FIG. 3, omitting part of the showing in FIG. 3.

In FIGS. 1 and 2 of the drawing, I have illustrated one adaptation of my invention, wherein the speed reducer comprises a casing, generally identified by the reference character 10, the casing in the construction shown comprising two side plates 11 and 12 joined and spaced by an annular casing portion 13, the parts being held together by a number of circumferentially spaced bolts, one of which is indicated at 14 in FIG. 1. Suitably secured to each of the plates 11 and 12, centrally thereof, are bearings 15 and 16.

Rotatably mounted in the bearing 15 is an input or drive shaft 17 and rotatably mounted in the bearing 16 is an output or driven shaft 18. The shaft 17 has an eccentric bore 19 in which a stub shaft 20 is rotatably mounted, the shaft 20 carrying, at its free end and beyond the hub portion 21 of the shaft 17, a tooth-like member 22 in the form of a gear, sprocket or the like. Suitably fixed to the hub portion 21 of the shaft 17 is a lever member, generally identified by the reference character 23. This lever comprises two oppositely directed levers 24 and 25, the lever 24 supporting a counterweight 26; whereas, the lever 25 supports a stud or axis 27, on which an idler tooth-like member or sprocket 28 is freely rotatable. The stud 27 has a nut 29 at one end and a pin 30 at the opposed end for positioning the member 28 on the stud, suitable spacing washers being employed, as diagrammatically illustrated.

The driven shaft 18, in the construction shown, has an integral disc-type head 31 with a slot 32 in its periphery, in which a pin 33 fixed to the member 22 operates. The slot 32 is elongated, as clearly noted in FIG. 2 of the drawing, to compensate for eccentric movement of the member 22 with respect to the drive shaft 17.

Fixed to the bearing 16 is a stationary tooth-like member or sprocket 34 which preferably has a greater number of teeth than the teeth in the member 22. For illustrative purposes, the member 22 may have one tooth less than the member 34. In this connection no reference is to be made to the actual number of teeth diagrammatically illustrated in FIG. 2 of the drawing but, to give an example, the member 22 might have twenty teeth and the member 24 might have twenty-one teeth. Accordingly, in each revolution of the drive shaft 17, the driven shaft 18 will be driven at a ratio of 20:1.

Operatively engaging both of the members 22, 34 and the drive member 28 is an annular drive element which can be in the form of a flexible timing chain 35, diagrammatically illustrated in FIG. 2 of the drawing, and having teeth 36 on the inner surface thereof to contact the teeth of the respective members. In the construction shown, the element 35 is composed of rubber or synthetic rubber, as indicated by the sectioning in FIG. 1 of the drawing. This element is sufficiently wide to engage both of the members 22, 34, the member 28 having wider teeth than the width of the teeth in the members 22, 34, as will clearly appear from a consideration of FIG. 1. Each of the members has flexible rings overlying exposed sides thereof for maintaining the element 35 against displacement from the respective members, the member 28 having rings 28' on both sides thereof; whereas, the members 22 and 34 have rings 22', 34' on the exposed surfaces only thereof. These two members have their adjacent surfaces abutting, as will be clear from a consideration of FIG. 1 of the drawing.

In FIGS. 3 and 4 of the drawing, I have diagrammatically shown a modified form of reducer employing a casing, generally identified by the reference character 37. The casing has side plates 38 and 39 spaced by an annular casing portion 40, the parts being assembled by circumferentially spaced bolts 41.

At 42 and 43 are shown bearings fixed to the plates 38 and 39. Rotatable in the bearing 42 is an input or drive shaft 44 and rotatable in the bearing 43 is an output or driven shaft 45. The shaft 44 differs from the shaft 17 in having a lever member 46 with a single radially offset lever portion 47. However, it will be apparent that, as and when desired, an opposed lever portion can be employed for supporting a counterweight, as taught in FIG. 1 of the drawing. The lever portion 47 carries, at its end, an axially offset crescent-shaped shoe 48, the contour of which is diagrammatically illustrated clearly in FIG. 4 of the drawing.

As the structures of the driven tooth-like members of FIGS. 3 and 4 are generally similar to those of FIGS. 1 and 2, they will be briefly referred to as the member 49 fixed to the eccentrically supported stub shaft 50 mounted in the shaft 44 and the fixed member 51 fixed to the bearings 43, 52 illustrating the pin supported in 49 and operating in the slot 53, which is similar to the slot 32 and arranged in the disc head 54 of the shaft 45. At 55 is shown a drive element operatively engaging both of the members 49 and 51 and this element is preferably circular in form or, when this element is of flexible characteristics, similar to the element 35, is maintained in circular form by the crescent-shaped shoe 48, as diagrammatically illustrated in FIG. 4 of the drawing. As in FIG. 1 of the drawing, the members 49 and 51 have flexible rings 49', 51' at sides thereof for maintaining the element 55 in constant engagement with said members. It will be apparent that, in the showing of FIGS. 2 and 4 of the drawing, the rings on the respective tooth-like members are omitted for clarification in the showing in these two figures.

With both forms of construction, it will be understood that the lever members 23, 46 rotate in the respective casings, as the drive shafts 17, 44 are rotated. This moves the member 28 and the shoe 48 circumferentially around the fixed members 34 and 51, respectively, in maintaining constant engagement of the elements 35 and 55 with the teeth of the members 22, 34 and 49, 51. As with the structure shown in FIG. 1, the member 49 will have at least one tooth less than the member 51 in providing the reduction drive between the drive shaft 44 and the driven shaft 45. With both forms of construction, the differential in teeth may be varied to suit the reduction desired. As stated earlier, the element 55 is an annular member and can be in the form of an internal gear. However, in the present illustration and in lieu of the sectioning in FIG. 3, the element 55 has been indicated as composed of flexible material.

Having fully described my invention, what I claim as new and desire to secure by Letters Patent is:

1. A speed reducer comprising axially alined drive and driven shafts, a lever member fixed to and driven by said drive shaft, a fixed sprocket encircling the driven shaft and in which said driven shaft is rotatably mounted, a rotatable sprocket adjacent one side of said fixed sprocket and having less teeth than the teeth of said fixed sprocket, said rotatable sprocket having an axis supported in and eccentric to the axis of said drive shaft, means establishing a movable coupling engagement between said rotatable sprocket and said driven shaft, an endles drive element having teeth operatively engaging the teeth of both of said sprockets, and said lever member having means rotating around said sprockets and arranged within and operatively engaging said element in maintaining the teeth of said element in constant engagement with the teeth of both of said sprockets in reduction drive of the driven shaft by said drive shaft.

2. A speed reducer as defined in claim 1, wherein said lever member includes means counterbalancing said last named means.

3. A speed reducer as defined in claim 1, wherein said element comprises a flexible belt.

4. A speed reducer as defined in claim 1, wherein said last named means comprises an idler sprocket operatively engaging said element.

5. A speed reducer as defined in claim 1, wherein said last named means comprises a crescent-shaped shoe operatively engaging said element.

6. A speed reducer as defined in claim 4, wherein all of said sprockets include means maintaining alinement of said element thereon.

7. A speed reducer of the character defined, comprising a casing, a drive shaft rotatably mounted in one side of the casing, a driven shaft rotatably mounted in the opposed side of the casing, a lever member fixed to the drive shaft and rotatably mounted in the casing, a sprocket fixed to the casing and in which said driven shaft is rotatably mounted, another sprocket arranged in the casing on one surface of said fixed sprocket, said last named sprocket being mounted on an axis arranged in and eccentric to the axis of said drive shaft and having a projecting pin operatively engaging said driven shaft, the second named sprocket having less teeth than said fixed sprocket, an endless drive element having internal teeth operatively engaging the teeth of both of said sprockets, and said lever member having means rotating around said sprockets and arranged within and operatively engaging said element in maintaining the teeth of said element in constant engagement with the teeth of both of said sprockets in reduction drive of the driven shaft by said drive shaft.

References Cited in the file of this patent

UNITED STATES PATENTS

| | | |
|---|---|---|
| 1,556,399 | Bartlett | Oct. 6, 1925 |
| 2,488,833 | Sharp et al. | Nov. 22, 1949 |